US00RE38755E

(19) United States
(12) Reissued Patent
Gueret

(10) Patent Number: US RE38,755 E
(45) Date of Reissued Patent: Jul. 12, 2005

(54) PROGRESSIVE BRUSH FOR APPLYING A COSMETIC PRODUCT

(75) Inventor: Jean-Louis H. Gueret, Paris (FR)

(73) Assignee: L'Oreal, Paris (FR)

(21) Appl. No.: 09/745,255

(22) Filed: Dec. 22, 2000

Related U.S. Patent Documents

Reissue of:
(64) Patent No.: 5,853,011
Issued: Dec. 29, 1998
Appl. No.: 08/805,571
Filed: Feb. 25, 1997

(30) Foreign Application Priority Data

Feb. 29, 1996 (FR) ..... 96 02562

(51) Int. Cl.[7] ..... A45D 40/26
(52) U.S. Cl. ..... 132/218; 132/317
(58) Field of Search ..... 132/218, 216, 132/217, 313, 317, 320; 15/206, DIG. 5

(56) References Cited

U.S. PATENT DOCUMENTS

| | | | |
|---|---|---|---|
| 565,328 | A | | 8/1896 Buhler |
| 1,806,520 | A | | 5/1931 Cave |

(Continued)

FOREIGN PATENT DOCUMENTS

| | | | |
|---|---|---|---|
| DE | 42 05 935 | | 9/1993 |
| EP | 0 511 842 | | 11/1992 |
| EP | 0 663 161 | A1 | 7/1995 |
| EP | 0 511 842 | | 6/1998 |
| FR | 726 157 | | 5/1932 |
| FR | 2 285 101 | | 4/1976 |
| FR | 2 505 633 | | 11/1982 |
| FR | 2605505 | * | 4/1988 |
| FR | 2 678 494 | | 1/1993 |
| FR | 2 701 198 | | 8/1994 |
| FR | 2715038 | * | 7/1995 |
| FR | 2 730 910 | | 8/1996 |
| FR | 2 730 911 | | 8/1996 |
| FR | 2 745 272 | | 8/1997 |
| GB | 1 335 322 | | 10/1973 |
| GB | 2146520 | * | 4/1985 |
| GB | 2170996 | * | 8/1986 |
| GB | 2 174 895 | | 11/1986 |
| JP | 56-91507 | U | 12/1954 |
| JP | 56-91507 | | 7/1981 |
| JP | 58-88912 | | 5/1983 |
| JP | 58-88912 | U | 6/1983 |
| JP | 5-88410 | | 4/1993 |
| JP | 5-88410 | U | 12/1993 |
| WO | WO 93/16617 | | 9/1993 |
| WO | WO 96/29905 | | 10/1996 |

OTHER PUBLICATIONS

English translation of FR 726 157.
Derwent Abstract of FR 2 701 198, Aug. 1994.
Derwent Abstract of FR 2 285 101, Apr. 1976.
Derwent Abstract of FR 2 505 633, Nov. 1982.
Derwent Abstract of FR 2 678 494, Jan. 1993.
Derwent Abstract of FR 2 730 910, Aug. 1996.
Derwent Abstract of FR 2 730 911, Aug. 1996.

(Continued)

*Primary Examiner*—Eduardo C. Robert
(74) *Attorney, Agent, or Firm*—Finnegan, Henderson, Farabow, Garrett & Dunner, LLP

(57) ABSTRACT

A brush for applying a cosmetic product, in particular for applying mascara to eyelashes or dye to hair, has an elongate core (2) formed by the helical winding of two strands of metal wire (3), with bristles (4) radially implanted in the core and being tightly held between the twisted strands. The brush is of an overall cylindrical shape and comprises at least one concave cutback (7) which holds the product during the wiping and which is obtained by clipping the brush. Such a brush allows a make-up to be obtained which is copious, regular and elongating.

69 Claims, 3 Drawing Sheets

U.S. PATENT DOCUMENTS

| | | | | |
|---|---|---|---|---|
| 1,962,854 | A | | 6/1934 | Anderson |
| 2,448,603 | A | | 9/1948 | Kevin et al. |
| 3,033,213 | A | | 5/1962 | Joss et al. |
| 3,214,782 | A | | 11/1965 | Masters et al. |
| 3,469,928 | A | | 9/1969 | Widegren |
| 3,908,675 | A | | 9/1975 | Spatz et al. |
| 3,908,676 | A | | 9/1975 | Levine et al. |
| 3,921,650 | A | | 11/1975 | Montgomery |
| 4,403,624 | A | * | 9/1983 | Montgomery |
| 4,458,701 | A | | 7/1984 | Holland |
| 4,461,312 | A | * | 7/1984 | Gueret |
| 4,527,575 | A | | 7/1985 | Vasas |
| 4,545,393 | A | | 10/1985 | Gueret et al. |
| 4,586,520 | A | * | 5/1986 | Brittain |
| 4,662,385 | A | | 5/1987 | Schefer |
| 4,784,505 | A | | 11/1988 | Dahm |
| 4,804,004 | A | | 2/1989 | Taylor |
| 4,810,122 | A | | 3/1989 | Cole |
| 4,887,622 | A | * | 12/1989 | Gueret |
| 4,898,193 | A | | 2/1990 | Gueret |
| 4,921,366 | A | | 5/1990 | Hurrell |
| 4,927,281 | A | | 5/1990 | Gueret |
| 4,993,440 | A | | 2/1991 | Gueret |
| 5,094,254 | A | | 3/1992 | Krueckel et al. |
| 5,137,038 | A | | 8/1992 | Kingsford |
| 5,197,497 | A | * | 3/1993 | Gueret |
| 5,224,787 | A | | 7/1993 | Vasas |
| 5,238,011 | A | | 8/1993 | Gueret |
| 5,339,841 | A | | 8/1994 | Gueret |
| 5,345,644 | A | | 9/1994 | Gueret |
| 5,357,987 | A | * | 10/1994 | Schrepf |
| 5,418,999 | A | | 5/1995 | Smith |
| 5,482,059 | A | * | 1/1996 | Miraglia |
| 5,542,439 | A | * | 8/1996 | Gueret |
| 5,551,456 | A | | 9/1996 | Hartel |
| 5,595,198 | A | | 1/1997 | Kemmerer |
| 5,613,258 | A | | 3/1997 | Hilfinger et al. |
| 5,709,230 | A | | 1/1998 | Miraglia |
| 5,722,436 | A | | 3/1998 | Vandromme et al. |
| 5,860,432 | A | | 1/1999 | Gueret |
| 5,876,138 | A | | 3/1999 | Gueret |
| 5,894,847 | A | | 4/1999 | Gueret |
| 5,934,292 | A | | 8/1999 | Gueret |
| 5,937,870 | A | | 8/1999 | Gueret |
| 6,067,997 | A | | 5/2000 | Gueret |

OTHER PUBLICATIONS

Derwent Abstract of FR 2 745 272, Aug. 1997.

Derwent Abstract of DE 42 05 935, Sep. 1993.

U.S. Appl. No. 09/761,701, filed Jan. 18, 2001, inventor: Jean–Louis H. Gueret.

U.S. Appl. No. 09/773,946, filed Dec. 22, 2000, inventor: Jean–Louis H. Gueret.

English language Derwent Abstract of JP 56–91507, Jul. 24, 1981.

English language Derwent Abstract of JP 58–88912, May 27, 1983.

English language Derwent Abstract of JP 5–88410, Apr. 9, 1993.

* cited by examiner

PROGRESSIVE BRUSH FOR APPLYING A COSMETIC PRODUCT

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a brush for applying a cosmetic product to keratinous fibers, in particular for applying mascara to eyelashes or dye to hair, as well as a device for making up, including this brush. Most frequently the brush comprises an elongate core formed by helically winding two strands of metal wire, and bristles radially implanted into the core and tightly held between the wound strands, the brush having at least one concave cutback which holds the product during wiping.

2. Description of the Related Art

FR-A-2605 505 shows a brush of this kind which allows the product to be applied to be properly taken up. Such product is held in a reservoir whose outlet, traversed by the brush, is provided with a wiper element intended to limit the charge of the product taken up by the bristles. According to this known document, the edges or borders delimiting the cutback are substantially straight. The brush allows relatively different make-ups to be obtained according to the zones of the brush and the edges used and according to the movement imparted to the brush. For example, the user may obtain a relatively heavy make-up if she does not rotate the brush around its axis at the time of the application, but then the lashes are not perfectly separated. On the other hand, she can obtain a light make-up if she rotates the brush around its axis, thus using the edges bordering the cutback. In all modes of use, a difference of make-up will be observed between the lashes situated at the periphery of the eyelid and those at the center of the lid, which are better charged, better curved, and/or better separated than the lashes at the sides of the lid.

FR-A-2715038 describes brushes with a cutback allowing, on the one hand, the product to be spread better at its intended location, to obtain large variations in wiping on the brush and to improve the ergonomic features of the making up and, on the other hand, the use of only one kind of wiper and a single stem diameter, while having the possibility of causing the charge on the lashes to be considerably varied without basically modifying the elegance of the brush. This result is obtained by the general shape of the brush which is a double frustum of coaxial cones joined at their large bases with the same diameter, and by the fact that the edges or borders delimiting the cutback are not straight. The make-up obtained with this type of brush is usually characterized by a heavy charge at the base of the lashes and a small curvature of the lashes.

Although the conventional brushes yield overall satisfactory results, it is desirable to have brushes available which make it possible to makeup lashes so that they are strongly curved, separated at their ends and heavily charged, which can not be effected with conventional brushes.

SUMMARY OF THE INVENTION

It is an object of the invention to provide a brush which makes it possible to makeup on lashes so that they are strongly curved, separated at their ends and heavily charged.

It is another object of the invention to provide a brush which is simple and economic to make and convenient to use.

According to a first aspect of the invention, a brush for the application of a cosmetic product to the keratinous fibres comprises an elongate core with bristles radially implanted in the core, the axial limits of a cylindrical envelope of the brush comprising at least one concave cutback with a major length dimension (λ). Bristles of a larger dimension are contained in a cylindrical envelope with a central axis I—I and defining at least one crest zone. The width (l) of the cutback varies from one end of the brush to the other and has a single maximum width (L) between the ends.

Thus the brush has a cutback comprised of shorter bristles, these bristles being more heavily charged with mascara. The intersection of the cylindrical envelope with the cutback defines a side with a concave shape which, in contrast to the conventional brushes, follows the shape of the set of lashes of an eyelid. Thus when the user applies the brush to the lashes in the region of the cutback, she charges the base of the lashes with mascara over the whole width of the eyelid. Then by rotating the brush around its central axis, she spreads the mascara over the entire length of each lash while combining the lashes and separating all the lashes over their whole length. This makes it possible to obtain a makeup that is simultaneously copious, regular, elongating and curving.

This brush is perfectly suitable for the makeup of eyelashes. Thus, according to a second aspect of the invention, a makeup device comprises a mascara reservoir and a mascara applicator, wherein the applicator comprises a brush according to the first aspect.

Preferably the core is formed by the helical winding of two strands of a metal wire, with the bristles tightly held between the wound up strands of the core. Preferably, the cutback or cutbacks are formed by clipping the brush. The axis of the cylinder enveloping those bristles having the largest dimension is defined as the central axis of the brush.

Advantageously, the contour of the cutback comprises at least one edge with a substantially rounded shape, which is preferably substantially parallel to the central axis of the brush. The contour of the cutback defines an edge which is most frequently sharp, but which can be trimmed to give it a rounded shape. The cutback has a greatest depth (d) which is preferably chosen to be smaller than or equal to its greatest width (L) and which is situated in the middle of the cutback, so to follow the shape of the eyelid in a better way.

Advantageously, the major axis (having the length λ) is substantially parallel to the axis of the brush. Preferably, the minor axis (L) of the cutback is substantially perpendicular to the axis of the brush, and (L) is smaller than or equal to the length (λ) of the major axis of the cutback so as to follow the shape of the eyelid in a better way. Preferably the cutback is symmetrical relative to a plane passing through the minor axis (of maximum width L) and perpendicular to the central axis.

The ends of the brush may be of any shape; they may, for example, have a straight section perpendicular to the central axis, a spherical cap or a cone frustum whose axis coincides with the central axis of the brush and whose base has the same diameter as the base of the enveloping cylinder.

The brush may have several cutbacks situated along different planes or surfaces, two adjacent such cutbacks determining between them at least one crest zone with a variable width (the width of a crest zone is measured along a direction perpendicular to the central axis of the brush).

Moreover, the bristles of the brushes in accordance with the invention may be of any kind: with tapered ends, or fork-shaped, or in the shape of pinheads, or they may have been subjected to any kind of treatment known to those in the art.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
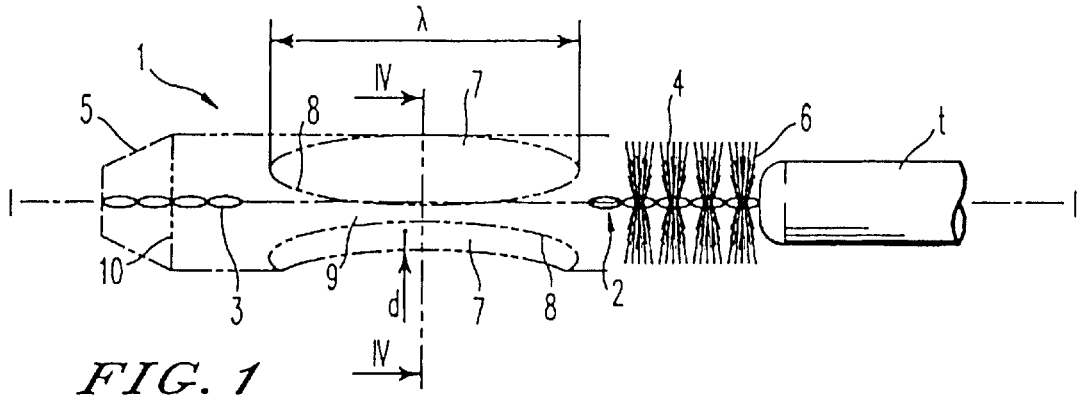
FIG. 1 shows a side view of a brush according to the invention.
Figure 2:
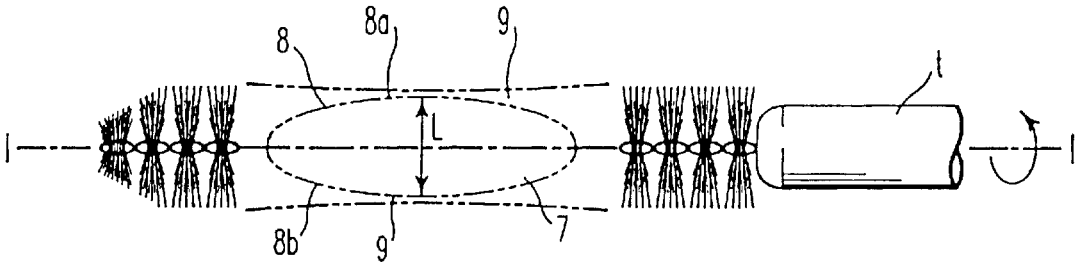
FIG. 2 is a view of the brush of FIG. 1 after being rotated by approximately 90° around the central axis I—I.
Figure 3:
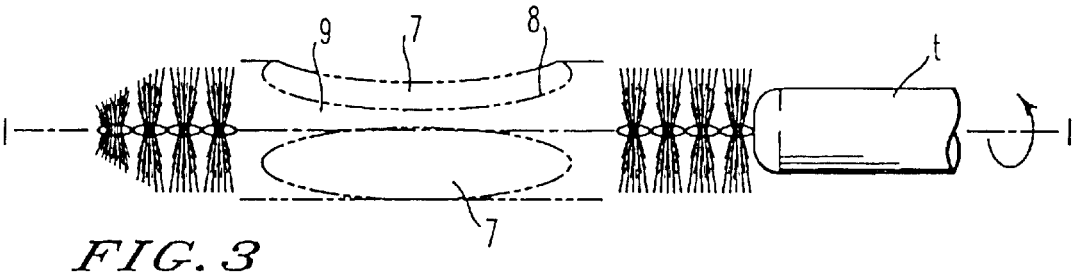
FIG. 3 shows a further rotation by approximately 90° around axis I—I.
Figure 4:
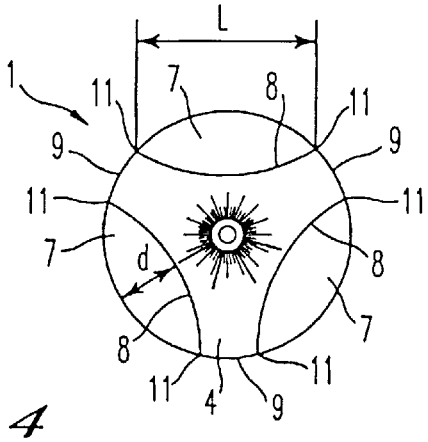
FIG. 4 shows a brush according to the invention in cross-section along plane IV—IV of FIG. 1, perpendicular to the axis I—I.

Referring to FIGS. 1 to 4, there may be seen a brush 1 for the application of a cosmetic product, in particular for the application of mascara to the eyelashes, comprising an elongate core 2 formed by the helical winding of two strands of a metal wire 3. The core 2 is folded into a U before the strands are twisted. The core 2 is force-fitted to the end of a stem t. Bristles 4 are radially implanted between the strands of the wire 3. When the strands of the wire 3 are twisted, the bristles are tightly held and kept in position between the helical turns of the core 2. The core 2 may be central, that is to say the core 2 defines an axis coinciding with the central axis I—I of the brush, as in the Figures, but it could instead be eccentric. The bristles 4 may be made of natural or synthetic fibres and may possibly be flocked; the brush 1 may comprise a mixture of bristles of different types (different diameters, shapes, cross-sections).

The enveloping surface of the brush is a cylinder with a central axis I—I. The brush 1 has a flat rear end 6 perpendicular to the axis I—I and frustoconical front end 5 coaxial with the axis I—I and has a base of the same diameter as the cylinder enveloping the brush and joined to the flat section 10 of the cylinder so as to be perpendicular to the axis I—I.

At its circumference, within the axial limits of the cylindrical envelope, the brush has three concave cutbacks 7 delimited by oval contours 8 with depth d and major axis length λ, and with a maximum width (minor axis) L such that λ>L>d. The contours 8 of the cutbacks have two rounded edges 8a and 8b substantially parallel to the axis I—I. The contours of the cutbacks define crest surfaces 9 at the enveloping cylinder of the brush.

In the example shown, the contour of the cutback is oval but it could also be circular (λ=L), elliptical, or constituted by two portions of intersecting circles whose concavities face one another.

The contours 8 of the cutbacks 7 define sharp edges 11 at the crest surfaces 9.

The cutbacks 7 are obtained by clipping the brush 1, that is, by cutting the bristles 4 of this brush with a clipper. Each of the cutbacks 7 is situated on the same side of the brush; i.e., they are not intersected by the core 2.

The contours 8 of the cutbacks 7 also do not reach the end planes 6, 10 of the cylinder, but in a variant provision could be made for the cutbacks to be tangential with or intersecting these end planes.

Figure 5:
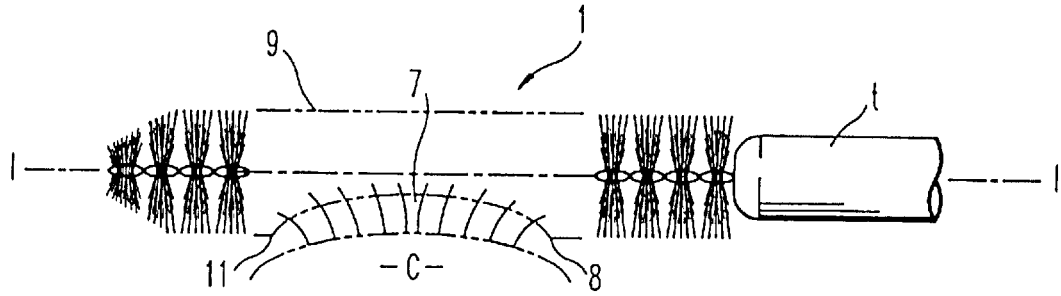
FIGS. 5 to 7 show a brush according to the invention in the course of use for the application of mascara to the lashes.
Figure 6:
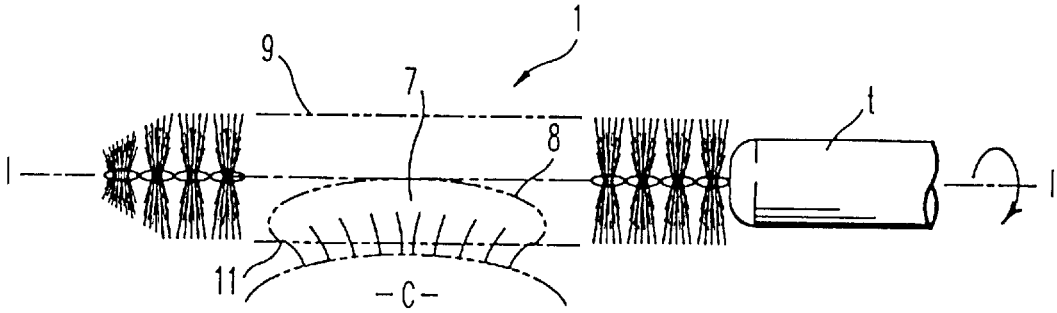
Figure 7:
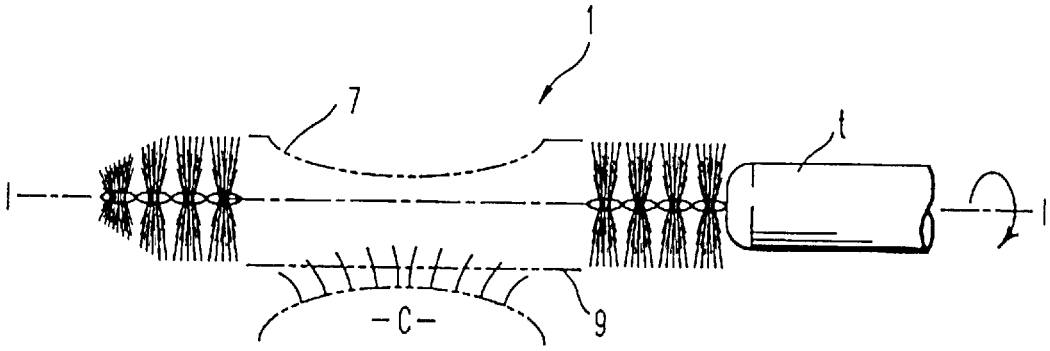

In FIGS. 5 to 7, which illustrate the method of use of the brushes according to the invention, the elements identical with, or performing functions similar to, the elements described above will be designated by the same reference numerals. Their description will not be repeated, or will only be discussed briefly. For the sake of simplification, the brushes shown in these Figures have a single cutback, but the functioning would be the same if the brush had several cutbacks.

In FIG. 5 there can be seen the whole set of the lashes of an eyelid C engaged by the shortest bristles of the brush, situated in the hollow of the concave cutback 7, which bristles are heavily charged with mascara. On contact with these bristles, the root end of each of the lashes will itself become heavily charged with mascara. When the user rotates the brush 1 about its axis (FIG. 6), the shape of the cutback ensures that the eyelashes continue to be in contact with the brush over their whole length and continue to be charged while being curved by the brush. The longer bristles of the edge 11 start combing the eyelash. As the user continues to rotate the brush (FIG. 7), the eyelashes are taken over by the longest bristles of the crest zone 9 which bristles have a cylindrical envelope and spread the product over the whole length of each lash, while combing. If the brush has several cutbacks, these charging and spreading-combing operations are repeated several times in the course of one complete rotation of the brush.

Each eyelash is charged over its whole length; there is no difference in make-up between the lashes at the sides of the lid and those of the center; the lashes are perfectly separated from one another, elongated and curved back.

Figure 8:
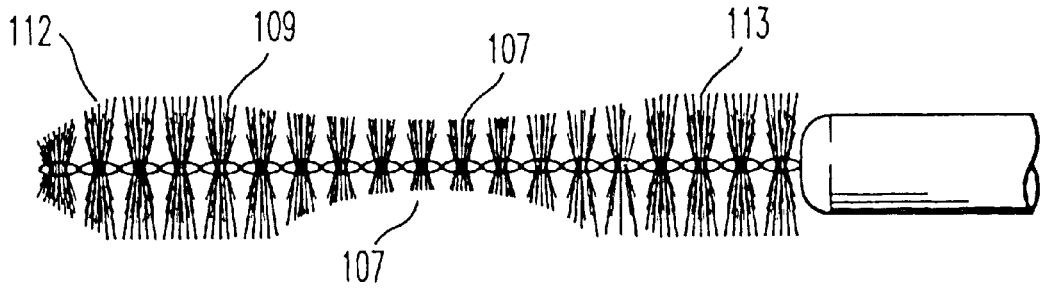
FIG. 8 shows a brush in accordance with the invention, with the density of the bristles of the brush varying along the core.

The mascara brush of FIG. 8 differs from that shown in FIGS. 1 to 4 by the variation of the density of the bristles. The cutbacks 107 are situated in zones with a low bristle density, which allows them individually to charge even more mascara. The end zones 112 and 113 of the brush as well as the crest zones 109 have a higher population density of bristles, which makes it possible to enhance the efficiency of the combing and of the separation of the lashes.

To obtain an even more heavily charged make-up, in another variant the crest zones may comprise an alternation of rows of short bristles and long bristles.

Figure 9:
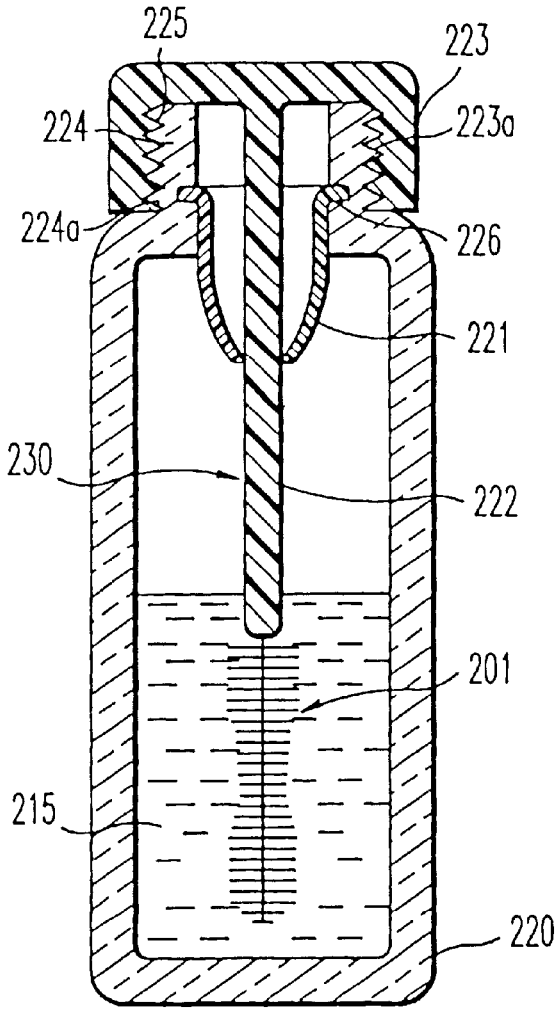
FIG. 9 shows a device in a longitudinal section for making up the eyes.

The eye makeup device shown in FIG. 9 has a cylindrical reservoir 220 with a threaded neck 224 surmounted by a gasket 226 and which is filled by mascara 215. The reservoir 220 has a wiper 221 made of a conventional flexible and elastic material and held in the neck via a bead 226 which cooperates with the shoulder separating the neck from the main part of the reservoir 220.

An applicator is intended to cooperate with the reservoir 220. This applicator is constituted by a gripping part 223 which supports the application element 230 comprising a stem 222 and a brush 201 identical with those shown in FIGS. 1 to 4. The gripping part 223 is cap-shaped and has a thread 223a which cooperates with the thread 224a of the neck of the reservoir. The leakproof obturation of the reservoir 220 is obtained by screwing the gripping part 223 onto the neck 224 of the reservoir provided with gasket 225.

When the application element 230 is taken out of the reservoir, the brush charged with mascara passes through the wiper 221 which wipes the long bristles of the crest zones much more extensively than the short bristles of the cutback. The application element in accordance with the invention can then be used to load the lashes.

Obviously, numerous modifications and variations of the present invention are possible in light of the above teachings. It is thereofre to be understood that the invention may be practiced otherwise than as specifically described herein.

What is claimed is:

1. A brush for application of a cosmetic product to keratinous fibers, comprising:

an elongate core; and bristles extending substantially radially from said core, wherein said bristles define a part of a cylindrical envelope with a central axis, and wherein bristles within the axial limits of the cylindrical envelope form at least one concave cutback and at least one crest zone on the cylindrical envelope, the width of the at least one concave cutback varying along the length of the brush, the at least one concave cutback having a single maximum width.

2. A brush according to claim 1 wherein said core comprises two helically wound strands of metal wire, and wherein said bristles are tightly held between the wound strands of the core.

3. A brush according to claim 1 wherein the at least one concave cutback comprises a clipped part of the bristles.

4. A brush according to claim 1 wherein the at least one concave cutback has a contour having at least one edge of a substantially round shape.

5. A brush according to claim 4 wherein said at least one edge has a portion substantially parallel to the central axis.

6. A brush according to claim 4 wherein the contour has at least two rounded edges substantially parallel to the central axis.

7. A brush according to claim 1 wherein the at least one concave cutback has a maximum depth which is not greater than the maximum width thereof and is situated substantially in the middle of the at least one concave cutback.

8. A brush according to claim 1 wherein the length of said at least one concave cutback is substantially parallel to the axis of the brush.

9. A brush to claim 1 wherein the core defines an axis coinciding with the central axis of the brush.

10. A brush according to claim 1 wherein the maximum width of the at least one concave cutback is substantially perpendicular to the axis of the brush.

11. A brush according to claim 1 wherein the maximum width is not greater than the length of the at least one concave cutback.

12. A brush according to claim 1 wherein the at least one concave cutback is symmetrical relative to a plane passing through the maximum width thereof and perpendicular to the central axis.

13. A brush according to claim 1, comprising at least two of said cutbacks.

14. A brush according to claim 1 wherein a contour of the at least one concave cutback is one of oval, circular, elliptical and one comprised of two portions of intersecting circles whose concavities face one another.

15. A brush according to claim 1 wherein a contour of the least one concave cutback defines a sharp edge.

16. A brush according to claim 1 wherein the at least one concave cutbacks are situated in zone with a low density of bristles, and wherein end zones of the brush and the at least one crest zone has a higher density of bristles.

17. A brush according to claim 1 wherein the at least one crest zone has an alternation of rows with shorter bristles and rows of longer bristles.

18. A brush according to claim 1, further comprising a gripping stem.

19. A brush according to claim 1, wherein the length of said at least one concave cutback is less than the axial length of the cylindrical envelope.

20. A device comprising:

a reservoir for mascara; and a mascara applicator having a brush for application of a cosmetic product to keratinous fibers, the brush comprising an elongate core and bristles extending substantially radially from said core wherein said bristles define a part of a cylindrical envelope with a central axis, and wherein bristles within the axial limits of the cylindrical envelope form at least one concave cutback and have at least one crest zone on the cylindrical envelope, the width of the at least one concave cutback varying along the length of the brush, the at least one concave cutback having a single maximum width.

21. A device according to claim 20, further comprising a cap for closing the reservoir in a leakproof manner, wherein the cap holds the applicator.

22. A brush according to claim 20, wherein the length of said at least one concave cutback is less than the length of the cylindrical envelope.

*23. A brush according to claim 1 wherein the at least one concave cutback is situated in a zone with a low density of bristles, and wherein end zones of the brush and the at least one crest zone have a higher density of bristles.*

*24. A brush for application of a cosmetic product, comprising:*

*an elongate core; and*

*bristles extending substantially radially from the core,*

*wherein at least some of the bristles define a part of a cylindrical envelope with a central axis, and wherein bristles within the axial limits of the cylindrical envelope form at least one concave cutback and at least one crest zone on the cylindrical envelope, the width of the at least one concave cutback varying along the length of the cylindrical envelope.*

*25. A brush according to claim 24, wherein some of the bristles are outside the axial limits of the cylindrical envelope.*

*26. A brush according to claim 24, wherein some of the bristles define an end zone outside the axial limits of the cylindrical envelope.*

*27. A brush according to claim 26, wherein the end zone has a frustoconical shape.*

*28. A brush according to claim 24, wherein the core comprises two helically wound strands of wire.*

*29. A brush according to claim 28, wherein the bristles are tightly held between the wound strands of the core.*

*30. A brush according to claim 24, further comprising a stem having an end, wherein the core is on the end of the stem.*

*31. A brush according to claim 30, wherein the core is force-fitted to the end of the stem.*

*32. A brush according to claim 24, wherein the core defines an axis coinciding with the central axis of the brush.*

*33. A brush according to claim 24, wherein the at least one concave cutback has a contour having at least one edge having a substantially round shape.*

*34. A brush according to claim 33, wherein the at least one edge has a portion substantially parallel to the central axis.*

*35. A brush according to claim 33, wherein the contour has at least two rounded edges substantially parallel to the central axis.*

*36. A brush according to claim 24, wherein the length of the at least one concave cutback is substantially parallel to the central axis.*

*37. A brush according to claim 24, comprising at least two of the concave cutbacks.*

*38. A brush according to claim 24, wherein a contour of the at least one cutback is selected from oval, circular, elliptical, and one comprised of two portions of intersecting circles whose concavities face one another.*

*39. A brush according to claim 24, wherein a contour of the at least one cutback defines a sharp edge.*

*40. A brush according to claim 24, wherein the at least one cutback is situated in a zone with a low density of bristles, and the at least one crest zone has a higher density of bristles.*

*41. A brush according to claim 24, wherein the at least one crest zone has an alternation of rows with shorter bristles and rows of longer bristles.*

*42. A brush according to claim 24, wherein the at least one concave cutback has a single maximum width.*

*43. A brush according to claim 42, wherein the at least one concave cutback has a maximum depth which is not greater than the maximum width of the at least one concave cutback.*

*44. A brush according to claim 43, wherein the maximum depth of the at least one cutback is situated substantially in the middle of the at least one concave cutback.*

*45. A brush according to claim 42, wherein the maximum width of the at least one concave cutback is substantially perpendicular to the axis of the brush.*

*46. A brush according to claim 42, wherein the maximum width is not greater than the length of the at least one concave cutback.*

*47. A brush according to claim 42, wherein the at least one concave cutback is symmetrical relative to a plane passing through the maximum width of the at least one concave cutback.*

*48. A brush according to claim 24, wherein the at least one concave cutback comprises a clipped part of the bristles.*

*49. A brush according to claim 24, wherein the bristles include longer bristles and shorter bristles.*

*50. A brush according to claim 49, wherein the longer bristles define the at least one crest zone and the shorter bristles define the at least one cutback.*

*51. A brush according to claim 49, wherein the longer bristles define the part of the cylindrical envelope.*

*52. A brush according to claim 24, wherein bristles within the axial limits of the cylindrical envelope define a portion of the at least one concave cutback.*

*53. A brush according to claim 52, wherein a contour of the at least one concave cutback intersects one of the axial limits of the cylindrical envelope.*

*54. A brush according to claim 24, wherein a contour of the at least one concave cutback is tangential to one of the axial limits of the cylindrical envelope.*

*55. A method of applying a cosmetic product to a surface region of a body, comprising:*

*providing the brush of claim 24;*

*placing a cosmetic product on the bristles; and*

*transferring the cosmetic product from the bristles to a surface region of a body.*

*56. The method of claim 55, wherein the cosmetic product is mascara and the surface region includes eyelashes.*

*57. The method of claim 55, wherein the cosmetic product is hair dye and the surface region includes hair.*

*58. The method of claim 55, wherein a portion of the brush further comprises a stem to be grasped by a user during application of the product, and wherein the method further comprises grasping the stem.*

*59. A device comprising:*

*a reservoir for cosmetic product; and*

*a cosmetic product applicator including a brush for application of a cosmetic product, the brush comprising an elongate core and bristles extending substantially radially from the core,*

*wherein at least some of the bristles define a part of a cylindrical envelope with a central axis, and wherein bristles within the axial limits of the cylindrical envelope form at least one concave cutback and at least one crest zone on the cylindrical envelope, the width of the at least one concave cutback varying along the length of the cylindrical envelope.*

*60. The device according to claim 59, further comprising a cosmetic product contained in the reservoir.*

*61. A device according to claim 60, wherein the cosmetic product is selected from one of mascara and hair dye.*

*62. A device according to claim 59, further comprising a cap for closing the reservoir, the cap being attached to the brush.*

*63. A device according to claim 59, wherein the length of the at least one concave cutback is less than the length of the cylindrical envelope.*

*64. A device according to claim 59, wherein the brush comprises at least two of the concave cutbacks.*

*65. The device according to claim 59, wherein the reservoir includes an opening and a wiper configured to remove excess product from the bristles when the cosmetic applicator is withdrawn from the reservoir.*

*66. The device according to claim 65, wherein the wiper is made of an elastomeric material.*

*67. A device according to claim 59, wherein the bristles within the axial limits of the cylindrical envelope define a portion of the least one concave cutback.*

*68. A device according to claim 67, wherein a contour of the at least one concave cutback intersects one of the axial limits of the cylindrical envelope.*

*69. A device according to claim 59, wherein a contour of the at least one concave cutback is tangential to one of the axial limits of the cylindrical envelope.*

* * * * *